US010296328B2

(12) United States Patent
Chaganti et al.

(10) Patent No.: US 10,296,328 B2
(45) Date of Patent: May 21, 2019

(54) INFRASTRUCTURE CONFIGURATION AND INVENTORY MANAGER

(71) Applicant: Dell Products L.P., Round Rock, TX (US)

(72) Inventors: Ravikanth Chaganti, Bangalore (IN); Rizwan Ali, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/588,264

(22) Filed: May 5, 2017

(65) Prior Publication Data

US 2018/0321934 A1 Nov. 8, 2018

(51) Int. Cl.
*G06F 9/44* (2018.01)
*G06F 8/71* (2018.01)
(Continued)

(52) U.S. Cl.
CPC ............... *G06F 8/71* (2013.01); *G06F 8/60* (2013.01); *G06F 8/61* (2013.01); *G06F 8/62* (2013.01);
(Continued)

(58) Field of Classification Search
CPC ..... G06F 8/61; G06F 8/62; G06F 8/65; G06F 8/71; G06F 9/44505; G06F 8/60; G06F 9/44526; G06F 9/50
(Continued)

(56) References Cited

U.S. PATENT DOCUMENTS 6,928,644 B1 * 8/2005 Kroening ................. G06F 8/63
717/121
8,239,498 B2 * 8/2012 Kilpatrick .......... G06Q 10/0875
709/217
(Continued)

OTHER PUBLICATIONS

Ballard, "JBoss Operations Network 3.2 Using JBoss Operations Network for Monitoring, Deploying, and Managing Resources", 2013, Red Hat, Inc., 560 pages.*
(Continued)

*Primary Examiner* — Ted T. Vo
(74) *Attorney, Agent, or Firm* — Jackson Walker L.L.P.

(57) ABSTRACT

A configuration management resource manages the solution-level configuration of an infrastructure that includes a plurality of deployed information handling resources. The management resource has access to a master manifest, corresponding to the solution infrastructure, that identifies one or more baselined configurations of the solution infrastructure. The master manifest may include a resource type identifier corresponding to each resource deployed in the infrastructure. For each resource type, the manifest may identify all compliance-capable resources, one or more baselined components for each of said resources, and one or more baseline-required attributes for each of said components. The management resource may register resource specific plugins to implement a standard set of REST-compliant methods. The management resource may determine the current configuration of deployed infrastructure, validate the current configuration against baseline configurations identified in the manifest, and incorporate a point in time configuration as a versioned baseline in master manifest.

20 Claims, 7 Drawing Sheets

(51) Int. Cl.
  *G06F 9/445* (2018.01)
  *G06F 8/61* (2018.01)
  *G06F 8/65* (2018.01)
  *G06F 8/60* (2018.01)
  *G06F 9/50* (2006.01)

(52) U.S. Cl.
  CPC ............ *G06F 8/65* (2013.01); *G06F 9/44505* (2013.01); *G06F 9/50* (2013.01); *G06F 9/44526* (2013.01)

(58) Field of Classification Search
  USPC .................................................. 717/120–123
  See application file for complete search history.

(56) References Cited

U.S. PATENT DOCUMENTS 8,549,114 B2 * 10/2013 Reddy ..................... G06F 9/466
              709/221
9,495,152 B2 * 11/2016 Suit ....................... G06F 9/5077

OTHER PUBLICATIONS

Microsoft Developer Network, "Solution Configuration", Dec. 2014, MSDN Library, retrieved from https://msdn.microsoft.com/en-us/library/bb166577.aspx , 2 pages.*
RESTful API Tutorial, "What is REST API", Sep. 2016, retrieved from https://web.archive.org/web/20160901135243/https://restfulapi.net/ , 4 pages.*
Sam Deering, "Do You Know What a REST API Is?", Dec. 2012, retrieved from https://www.sitepoint.com/, 8 pages.*

* cited by examiner

140— VERSION;
  142— INCLUDED RESOURCE TYPES;   \ e.g., 2 Rack Mount Servers, 1 Rack Mount Chassis, 2 Storage Enclosures \
    144— CAPABLE RESOURCES LIST;   \ per resource type \
    146— COMPONENTS LIST;   \ per capable resource \
    148— BASELINE SPECS;   \ per component, includes make model version dependencies adjacencies, etc. \

```
{
150— "RTM": {
  151— "PEServer": {
    152— "PowerEdge R730xd": {
      153— "HBA": {
        154— "allOf": [
          {
            155— "Model": "Qlogic QLE2662",
                  "Type": "PCIe",
                  "Slot": 3,
            157— "Version": {
              158— "Minimum": "09.17.20.07",
              159— "Current": "09.17.20.07"
            },
            161— "DependsOn": {
              162— "ResourceType": "DellStorage",
              164— "Version": {
                166— "Minimum": "6.75",
                168— "Current": "7.00"
              }
            },
            171— "ConnectedTo": {
              172— "ResourceType": "BrocadeFabric",
              173— "Version": {
                174— "Minimum": "6.3",
                      "Current": "7.3"
              }
            }
          }
        ]
      },                                          ←121
      "Network": {
        "allOf": [
          {
            "Model": "Qlogic 57810 10GbE rNDC",
            "Type": "Integrated",
            "Version": {
              "Minimum": "23.00.20.07",
              "Current": "25.25.10.00"
            },
            "ConnectedTo": {
              "ResourceType": "DellNetwork",
              "Model": "Dell Networking S4048T",
              "Version": {
                "Minimum": "9.9.0",
                "Current": "9.10.1P"
```

FIGURE 3C

```
              }
             }
            }
           ]
          }
         }
        },
        "DellNetwork": {
          "allOf": {
            "Dell Networking S4048-ON": {
              "Version": {
                "Minimum": "9.9.0",
                "Current": "9.10.1P"
              },
              "Count": 2
            },
            "Dell Networking S3048-ON": {
              "Version": {
                "Minimum": "9.9.0",
                "Current": "9.10.1P"
              },
              "Count": 1
            }
          }
        },
```

FIGURE 3D

```
175 — "DellStorage": {
         "anyOf": {
            "Dell Storage SC4020": {
               "Speed": {
                  "anyOf": [
                     "16Gbps",
                     "8Gbps"
                  ]
               },
               "Version": {
                  "Minimum": "6.75",
                  "Current": "7.00"
176 ─┤        }
            },
            "Dell Storage SC8000": {
               "Speed": "16Gpbs",
               "Version": {
                  "Minimum": "6.75",
                  "Current": "7.00"
               }
            }
         }
      },
177 — "BrocadeFabric": {
         "allOf": {
            "Brocade 6510": {
               "Version": {
                  "Minimum": "6.3",
178 ─┤              "Current": "7.3"
               },
               "Count": 2
            }
         }
      }
   }
}
```

INFRASTRUCTURE CONFIGURATION AND INVENTORY MANAGER

TECHNICAL FIELD

The present disclosure relates in general to managing enterprise class information handling systems and, more particularly, to obtaining, validating, and baselining configurations of such systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The importance of information technology (IT), which refers to the use of information handling systems to acquire, access, analyze, generate, and transmit data, especially in the context of a business or other enterprise, has increased dramatically with the proliferation of broadband communication infrastructure, affordable and sophisticated network-aware mobile devices, computerized applications for business and consumers, and oceans of data generated by such applications. Data centers came into existence as enterprises heavily invested in IT quickly recognized the need to create specialized facilities and resources to house and manage information handling systems and related infrastructure and components.

The architecture of early data centers was generally silo-like or vertical, with IT resources implemented in a non-shared landscape for a specific and limited application or objective. Vertically oriented data centers typically resulted in high capital costs, high operating costs, low utilization, poor interoperability, ad hoc management, and one-dimensional security. Horizontal data centers, characterized by the use of at least some degree of virtualization and/or co-located data center facilities, evolved in response to scaling and cost issues inherent in the vertical data center model. While reducing costs and improving utilization, horizontal data centers inherited the fragmented nature of the original data centers, wherein processing resources are acquired separately from storage resources which are acquired separately from networking resources and so forth.

SUMMARY

A disclosed managed infrastructure platform includes features for managing information handling systems. Although applicable to all types of information handling system, infrastructure services manager features may be described in the context of converged infrastructure systems, hyper-converged infrastructure systems, hybrid cloud systems, and other types of enterprise-scale information handling systems, all of which may be collectively or generically referred to herein as solution infrastructures. Disclosed infrastructure services manager features include features that address various IT objectives including system consolidation, improved utilization of resources, and lower costs. Solution infrastructures support these objectives by implementing pools of compute, storage, and networking resources that can be shared by multiple applications and managed in a collective manner using policy-driven processes.

Converged infrastructure systems include information handling systems in which two or more distinct information handling resources are interconnected and validated by a vendor prior to deployment. A non-limiting example of a converged infrastructure system might comprise a modular chassis that include one or more modular compute enclosures, one or more network attached storage devices, and one or more switching resource. Hyper-converged systems include systems in which the virtualization of compute resources and the virtualization of storage resources are integrated into a software defined environment. Hyper-converged systems may be implemented as a group of off-the-shelf rack servers, each of which includes processing resources and direct attached storage resources.

Whether implemented in an enterprise's premises-based data center or, increasingly, a third party data center for providing outsourced, co-located, and/or cloud-based IT resources to an enterprise, solution infrastructures facilitate consolidation of IT resources and simplify IT management while facilitating improvements in utilization and cost reductions. However, the introduction of readily available, solution infrastructures has occurred comparatively recently. Accordingly, resources and techniques for managing the building, deployment, and operation of solution infrastructures are yet to be fully implemented and optimized.

Subject matter disclosed in this and other applications address numerous challenges associated with ensuring that: (a) solution infrastructures are properly built before being deployed, (b) properly-built solution infrastructures are properly deployed, and (c) properly-deployed solution infrastructures remain operational and continue to deliver an expected level of performance.

In accordance with subject matter disclosed herein, an information handling system, referred to herein as a configuration management resource, manages the solution-level configuration of an infrastructure that includes a plurality of deployed information handling resources including, in at least one embodiment, a plurality of information handling resources deployed in one or more rack cabinets of a data center.

In such embodiments, the plurality of information handling resources may be heterogeneous or homogeneous. A heterogeneous infrastructure may include a plurality of different types of information handling resources. Such information handling resources may include, as non-limiting examples: stand-alone or rack mount server resources, with or without direct attached storage; stand-alone or rack mount chassis enclosures; modular compute, storage, and/or switching information handling resources suitable for use with a chassis enclosure; storage resources, including physical storage enclosures and software defined storage resources; network switches; and other suitable resources.

Although the illustrations described below emphasize the configuration of physical and tangible information handling resources, the solution-level configuration and inventory management described herein extends to virtualized and containerized resources, whether implemented on-premises or in a private or hybrid cloud platform.

In at least one embodiment, the configuration management resource has access to a master manifest, corresponding to the solution infrastructure, that identifies one or more baselined configurations of the solution infrastructure. The master manifest may include a resource type identifier corresponding to each of information handling resources deployed in the solution infrastructure. As an example, if a solution infrastructure comprises a data center rack cabinet that includes two rack mount servers, a storage enclosure, and a network switch, the master manifest may identify four information handling resource types including two rack mount server types, a rack mount storage enclosure type, and a rack mount switch type.

For each of the resource types identified in a master manifest, the master manifest may further identify all compliance-capable information handling resources, i.e., all information handling resources that satisfy any restrictions or limitations imposed by the master manifest on attributes including, without limitation, make or manufacturer, model, version, speed, size/capacity, communication interface, and the like. Continuing with the example from above, in which the first information handling resource type is a rack mount server type, if the set of all baselined configurations of the solution infrastructure includes two different models of rack mount servers employed as the first rack mount server, the master manifest may list both of the compliance-capable servers under the first information handling resource type. The master manifest may further indicate one or more baselined components for each of the one or more compliance-capable resources and one or more baseline-required attributes of each of the one or more components. In this manner, the master manifest may identify all permutations of information handling resources that may be used in a compliant configuration as well as one or more components and one or more attributes for each of the components.

The baseline required attributes for any particular resource may include attributes such as make, model, and version. In addition, however, to support configuration management at the solution level, disclosed embodiments of the configuration and inventory management may support one or more extended attributes including, as a non-limiting example, a dependency attribute indicating one or more other resources that, in conjunction with the particular resource under consideration, may be required for compliance with the solution level configuration. A second example of an extended attribute that the configuration management resource may support is an adjacency attribute indicative of any other resources to which the particular resource must be connected for compliance with a baselined solution-level configuration. Accordingly, disclosed embodiments support the ability to consider component level inter-dependencies for validated firmware and software through a master manifest and provide a method to perform solution configuration management in a heterogeneous and/or multi-vendor infrastructure.

In at least one embodiment, the management resource may be configured to perform a validation process to determine whether a deployed configuration, which may also be referred to herein as a point-in-time configuration, corresponds to any of one or more baselined configurations indicated in the master manifest. The validation process may include determining whether the plurality of baselined configurations include a baselined configuration comprising resources, components, and configuration parameters that match with the deployed configuration.

To support communication with the varied information handling resource types that may be included within a solution-level configuration, embodiments of the configuration management resource may employ one or more configuration plugins. In this context, a configuration plugin may provide a bridge between resource-specific implementations and a common set of configuration methods. To illustrate, if two different resources stores information regarding their respective capabilities in two different OS-recognized directories, the corresponding plugins would include information enabling each to find the information in the applicable directory.

Accordingly, if a solution infrastructure includes four deployed information handling resources, as many as four configuration plugins may be required by the configuration management resource. In some cases, deployed resources may be from different manufacturers, intended to perform different functions, or otherwise unique and, in such cases, there may be a 1:1 correspondence between deployed information handling resources and configuration plugins. In other embodiments, two or more instances of a single configuration plugin may support two or more resources deployed in a particular configuration. This could occur if the infrastructure included two or more instances of a particular information handling resource, but could also occur if any two or more resources that may be different in some respects, such as manufacturer, nevertheless provide a uniform configuration interface to the management resource.

Each configuration plugin may support one or more representational state transfer (REST) compliant methods that the configuration management resource may employ to communicate with deployed resources. Each configuration plugin may identify or define one or more interfaces, compatible with the deployed resource, for each of the RESTful methods. The particular set of REST-compliant methods may include a GET method, a SET method, and a TEST method. The GET method for a particular deployed resource may be configured to retrieve component information indicative of one or more components implemented in the particular deployed resource and configuration attributes for each such component. The TEST method may be suitable for determining whether a deployed resource is compliant with a baselined configuration while a SET method may be suitable to include a validated point in time solution-level configuration as one of the versioned baselines in the master manifest.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3B, consisting of the partial views of FIG. 3C, FIG. 3D, and FIG. 3E, illustrates the master manifest of FIG. 3A in more detail;

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, information handling modules may encompass information handling resources as well as software resources including software resources for managing information handling systems.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), Bluetooth, ISO 14443, ISO 15693, or other suitable standard), personal area networks (PAN) (e.g., Bluetooth), local area networks (LAN), wide area networks (WAN), narrowband personal communications services (PCS), mobile telephony technologies, broadband PCS, circuit-switched cellular, cellular digital packet data (CDPD), radio frequencies, such as the 800 MHz, 900 MHz, 1.9 GHz and 2.4 GHz bands, infra-red and laser.

Figure 1:
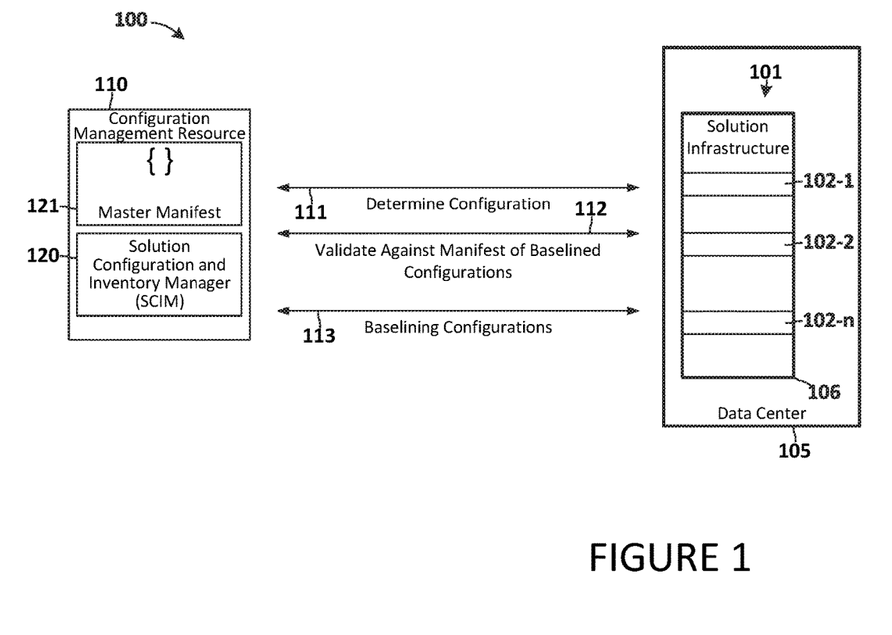
FIG. 1 is a block diagram illustrating a managed infrastructure platform including a configuration management resource in accordance with disclosed subject matter.

Turning now to the drawings, FIG. 1 illustrates selected elements of a managed infrastructure platform 100 in accordance with solution-level configuration determination and validation features disclosed herein. The managed infrastructure platform 100 illustrated in FIG. 1 includes a configuration management resource 110 and a plurality of information handling resources 102 collectively identified as solution infrastructure 101. The solution infrastructure 101 illustrated may encompass all hardware and software associated with information handling resources installed in one or more rack cabinets 106 of a data center 105. The configuration management resource 110 illustrated in FIG. 1 includes a solution configuration and inventory manager (SCIM) 120 and a data structure referred to as master manifest 121. The master manifest 121 may indicate or otherwise document one or more baselined configurations for solution infrastructure 101. In at least one embodiment, master manifest 121 indicates all permutations of baseline configurations of solution infrastructure 101.

Although FIG. 1 illustrates solution infrastructure 101 closely associated with one or more rack cabinets 106, as is commonly encountered in a data center such as data center 105 or another raised-floor platform, other embodiments of solution infrastructure 101 may be implemented as one or more interconnected stand-alone information handling resources. Similarly, although FIG. 1 emphasizes physical and tangible information handling resources 102 as the components of solution infrastructure 101, embodiments may manage infrastructure that includes one or more virtualized resources and/or one or more containerized resources, whether implemented on premises or in a hybrid or private cloud.

FIG. 1 identifies three configuration management features of the depicted configuration management resource 110. As illustrated in FIG. 1, configuration management resource 110 may be suitable for determining (111) a point-in-time configuration of solution infrastructure 101, validating (112) the point-in-time configuration against a known good or baseline configuration set forth in master manifest 121, and baselining (113) a point-in-time configuration of the solution infrastructure. Configuration management resource 110 may invoke the assistance of one or more configuration plugin resources, more simply referred to herein as configuration plugins (not shown in FIG. 1). Configuration plugins may provide functionality for mapping a standard set of solution configuration and inventory methods to the implementation details of a particular information handling resource deployed in the solution. The configuration management resource 110 may require as many as one configuration plugin for each information handling resource 102 deployed in solution infrastructure 101.

Figure 2:
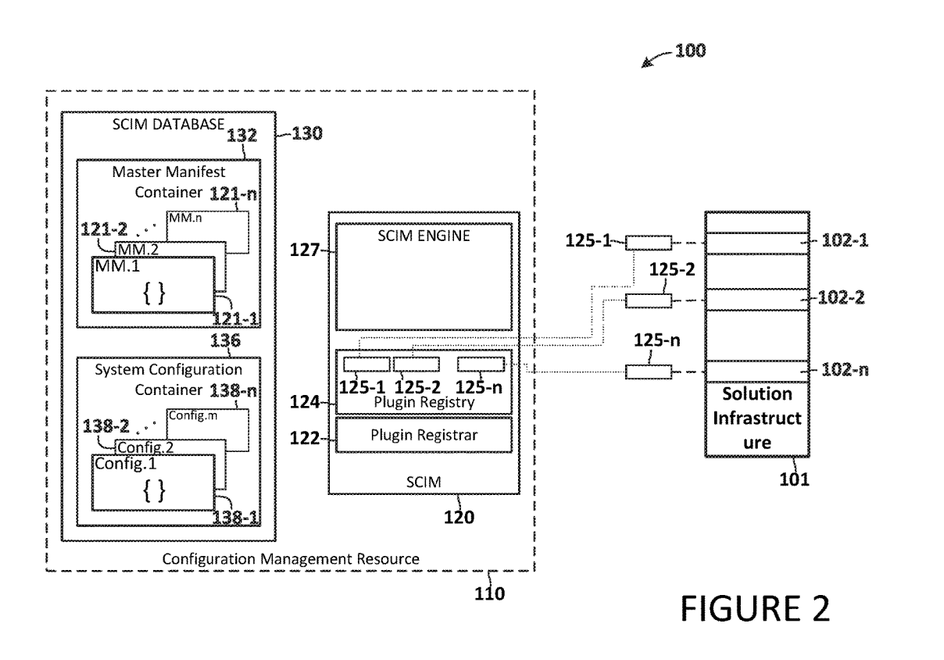
FIG. 2 is a block diagram illustrating additional detail of the managed infrastructure platform of FIG. 1.

Turning now to FIG. 2, elements of managed infrastructure platform 100 are illustrated in further detail. The SCIM 120 illustrated in FIG. 2 includes SCIM engine 127, a plugin registry 124, and a plugin registrar 122. The plugin registrar 122 may be responsible for registering configuration plugins 125, wherein each information handling resource 102 deployed in solution infrastructure 101 is associated with one of the configuration plugins 125. As plugin registrar 122 registers individual configuration plugins 125, the configuration plugins are imported into plugin registry 124.

The configuration plugins 125 may provide a layer of abstraction between individualized and/or proprietary hardware interfaces corresponding to information handling resources 102 and REST-ful interfaces exposed by SCIM 120. When a configuration plugin 125 is registered, plugin registrar 122 registers each such REST-ful compliant interface in plugin registry 124.

As illustrated in FIG. 2, configuration management resource 110 comprises a SCIM database 130 that includes one or more master manifests 121. The SCIM database 130 includes a master manifest container 132 that includes one or more master manifests 121. Similarly, SCIM database 130 includes a solution configuration container 136 that includes one or more configurations 138. Each of the master manifests 121 may correspond to a version of solution infrastructure 101 and the plurality of master manifest may be versioned.

Figure 3A:
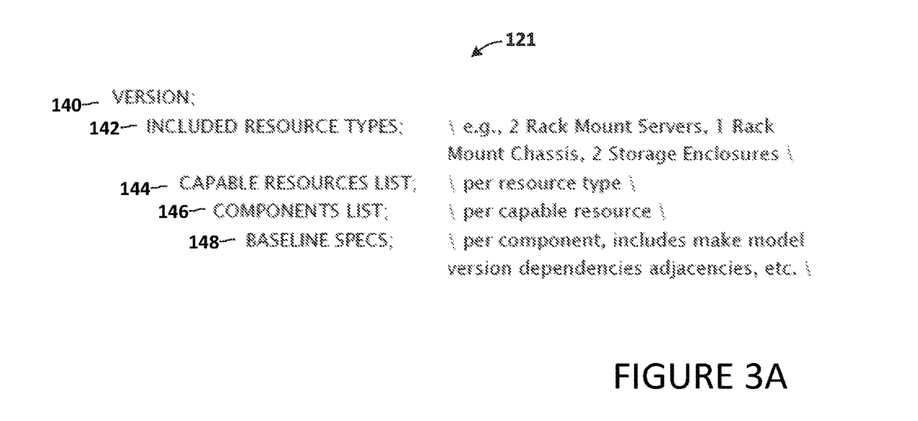
FIG. 3A illustrates a generic form of an example master manifest suitable for use in the managed infrastructure platform of FIG. 1 and FIG. 2.

Referring to FIG. 3A, a master manifest 121 is illustrated in canonical or generic form to emphasize the structure of the manifest rather than the particular elements identified therein. Additional detail of a master manifest specific to a particular implementation is provided in FIG. 3B. As illustrated in FIG. 3A, master manifest 121 includes a version identifier 140, resource type information 142, capable resources list 144, components list 146, and baseline specifications or attributes 148. As discussed previously, master manifest 121 may include a resource type identifier corresponding to each information handling resource 102 included in solution infrastructure 101. Thus, for example, because the solution infrastructure 101 illustrated above includes three information handling sources, 102-1 through 102-3, master manifest 121 may include three information handling resource identifiers within the included resource types 142. Each information handling resource type (not depicted individually) may indicate or include a capable resources list 144. Each capable resource indicated in capable resources list 144 may indicate or include a components list 146 indicating compliance-required components for each capable resource. FIG. 3A further illustrates baseline-required specifications or attributes 148 of the components identified in components list 146. Although FIG. 3A illustrates a particular structure for master manifest 121, other embodiments may employ master manifests with structures that are similar, but not necessarily identical, to the structure illustrated in FIG. 3A.

Figures 3B, 3C:
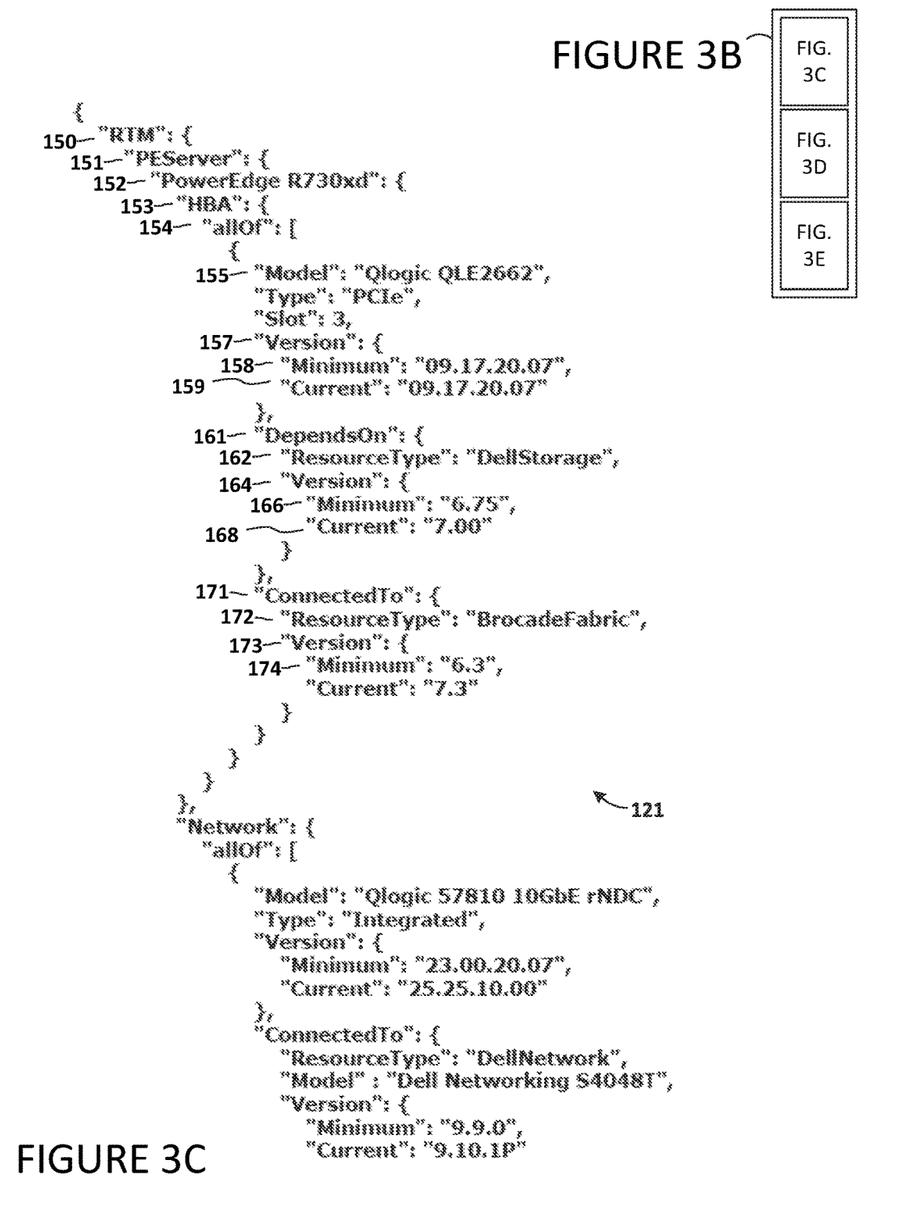
Figure 3D:
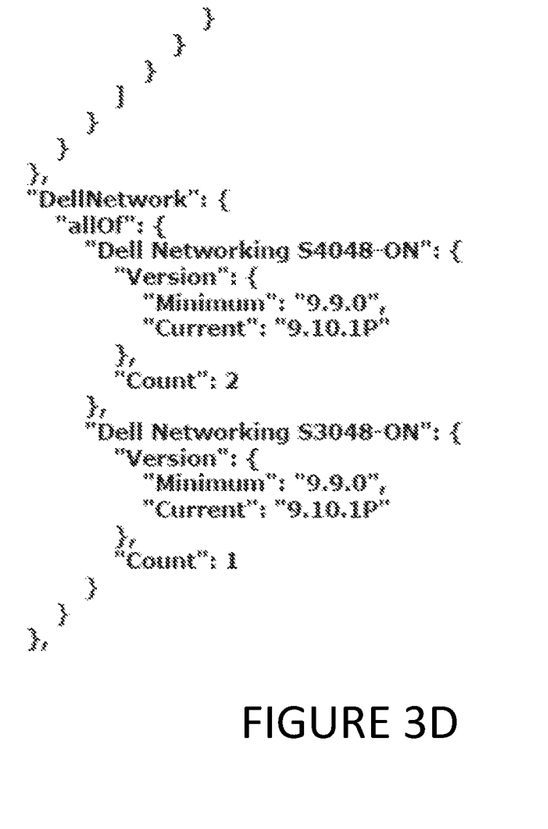
Figure 3E:
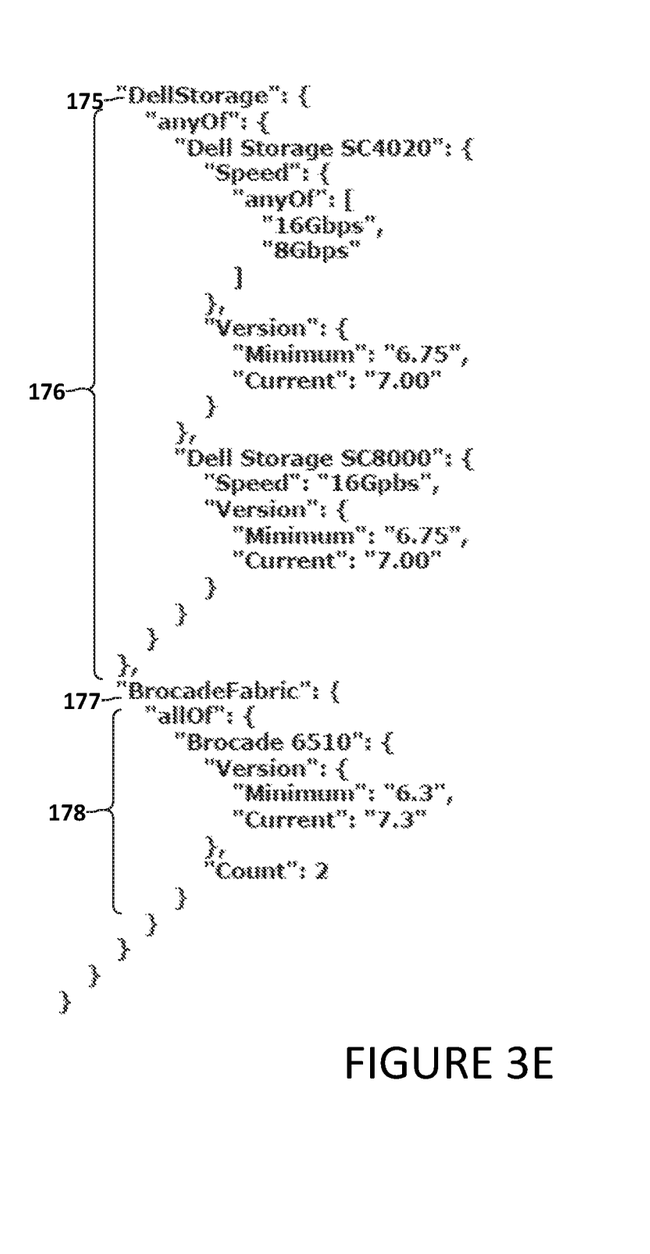

Referring now to FIG. 3B and its corresponding partial views FIG. 3C, FIG. 3D, AND FIG. 3E, master manifest details are illustrated to clarify the structure of at least one embodiment of master manifest 121. The master manifest 121 illustrated in FIG. 3C includes a version attribute 150 corresponding to the version identifier 140 of FIG. 3A and a resource type attribute 151 which constitutes one of the resource types 142 of FIG. 3A. The particular resource type attribute 151 illustrated in FIG. 3C identifies a rack mount server as the resource type. The master manifest illustrated in FIG. 3C further indicates a particular rack mount server, identified as an R730xd, as a compliance-capable resource 152, i.e., an information handling resource that is acceptable for the applicable resource type in at least one baselined configuration of the solution infrastructure 101.

The illustrated master manifest 121 includes a component attribute 153. The component attribute 153 illustrated in FIG. 3C identifies a host bus adapter (HBA) as the particular component before identifying one or more baselined required attributes of the particular component. Thus, the master manifest 121 of FIG. 3C indicates that a particular baselined configuration of the solution infrastructure 101 employs an R730xd as one of the solution's rack mount servers and that the R730xd must include a host bus adapter that satisfies attributes 155-159 under the "ALL-OF" qualifier 154.

The baselined attributes of the HBA include an HBA model indicated by the model attribute 155 and a version indicated by version attributes 157-159, including a minimum version attribute 158 and a current version attribute 159. In this example, the identified HBA model, a QLE2662, has a baseline compliant version since the current version, indicated by current version attribute 159 equals the minimum version indicated by minimum version attribute 158.

FIG. 3C further illustrates that master manifest 121 may include inter-resource attributes, also referred to herein as solution-level attributes or extended attributes. The DependsOn attribute 161 illustrated in FIG. 3C is an extended attribute that indicates solution-level dependency associated with the resource under scrutiny. In this particular illustration, DependsOn attribute 161 is an attribute of the component attribute 153 of the PowerEdge R730xd resource and, therefore, identifies resources that the solution infrastructure must have when the solution infrastructure employs a QLE2662 HBA in the R730xd rack server. In the illustrated master manifest 121, attributes 162, 164, and 166 specify that a DellStorage resource having the specified version must be included in solution.

The master manifest 121 of FIG. 3C further includes a second extended attribute, referred to herein as an adjacency attribute, in the form of the ConnectedTo attribute 171 that specifies a resource to which the applicable resource must be connected for baseline compliance. In the instance illustrated in FIG. 3C, ConnectedTo attribute 171 includes a ResourceType attribute 172 and a Version attribute 173. The ConnectedTo attribute 171 illustrated in FIG. 3C indicates "BrocadeFabric" as a value for ResourceType attribute 172 and 6.3 as a value for a Minimum attribute 174 of the Version attribute 173. Accordingly, the ConnectedTo attribute 171 illustrated in FIG. 3C indicates that version 6.3 or higher of a BrocadeFabric resource type must be connected to the QLE2662 HBA of the R730xd for baseline configuration compliance.

FIG. 3E further illustrates that the baseline configurations identified by master manifest 121 may further indicate required attributes 176 of a DellStorage attribute 175, referenced as a ResourceType 162 in dependsOn attribute 161 (FIG. 3C), and required attributes 178 of a BrocadeFabric attribute 177, referenced as a ResourceType 172 in ConnectedTo attribute 171 (FIG. 3C).

Figure 4:
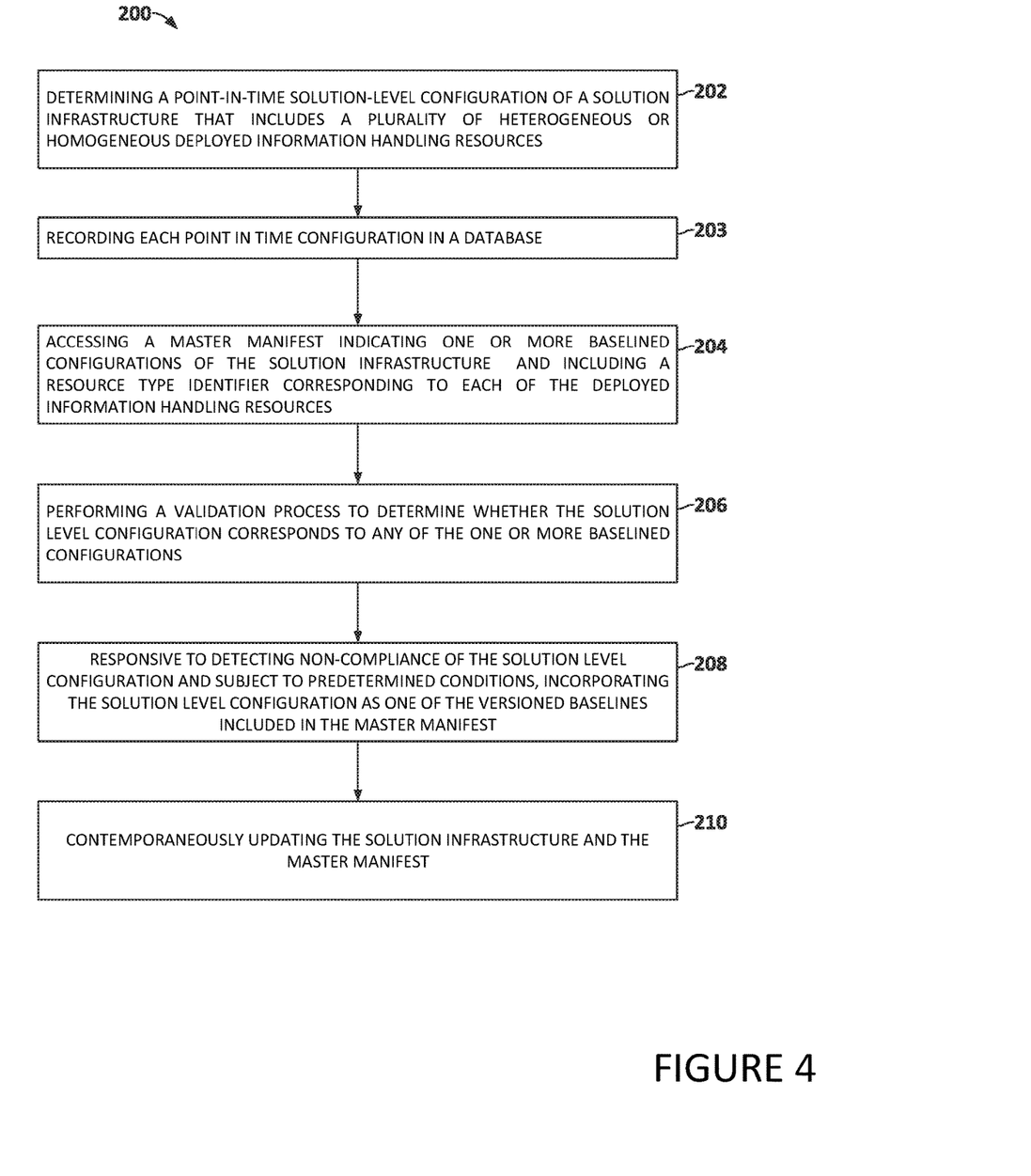
FIG. 4 is flow diagram illustrating a system management method.

FIG. 4 illustrates a flow diagram of a SCIM method 200 in accordance with the subject matter disclosed in the preceding figures. As illustrated in FIG. 4, method 200 includes determining (operation 202) a solution level configuration of a solution infrastructure that comprises a heterogeneous plurality of deployed information handling resources. As described with respect FIG. 1 and FIG. 2, the configuration determination may be facilitated by use of registered configuration plugins configured to interact with resource specific interfaces. Method 200 may include storing or otherwise recording (operation 203) each solution level configuration determined in operation 202. The system configuration contains 136 illustrated in FIG. 2 may be used to store and version different instances of point-in-time configurations exhibited by the solution infrastructure.

The method 200 illustrated in FIG. 4 further includes accessing (operation 204) a master manifest indicating one or more baselined configurations of the solution infrastructure. The master manifest, as described with respect to FIG. 3A and FIG. 3B, may include a resource-type attribute corresponding to each of the information handling resources deployed in the solution infrastructure.

The method 200 may further include performing, operation 206, a validation process to determine whether the solution level configuration, i.e., the point-in-time solution-level configuration of the solution infrastructure complies with or otherwise corresponds to any of the one or more baselined configurations set forth in the master manifest. The SCIM 120 (FIG. 2) may be configured to periodically perform method 200 to ensure that a deployed infrastructure maintains continuous compliance with a baseline.

In addition, if operation 206 determines that the solution infrastructure 101 has a point-in-time configuration that does not validate against any of the one or more baselined configurations in master manifest 121, method 200 may, subject to applicable administrative criteria, incorporate (operation 208) the solution level configuration as one of the versioned baselines included in the master manifest.

Method 200 may further include a update process (operation 210) during which the point in time configuration and the master manifest are updated contemporaneously as part of a planned upgrade.

The SCIM 120 of FIG. 2 may invoke any of the RESTful methods supported by the applicable configuration plugins to perform the operations of the method 220 illustrated in FIG. 4. For embodiments of configuration plugins that include GET, SET, and TEST methods, the GET method may be performed to obtain the current configuration in operation 202, the TEST method may be invoked to perform that validation in operation 206 and the SET method may be employed with respect to baselining point-in-time configurations in operations 208 and 210.

Figure 5:
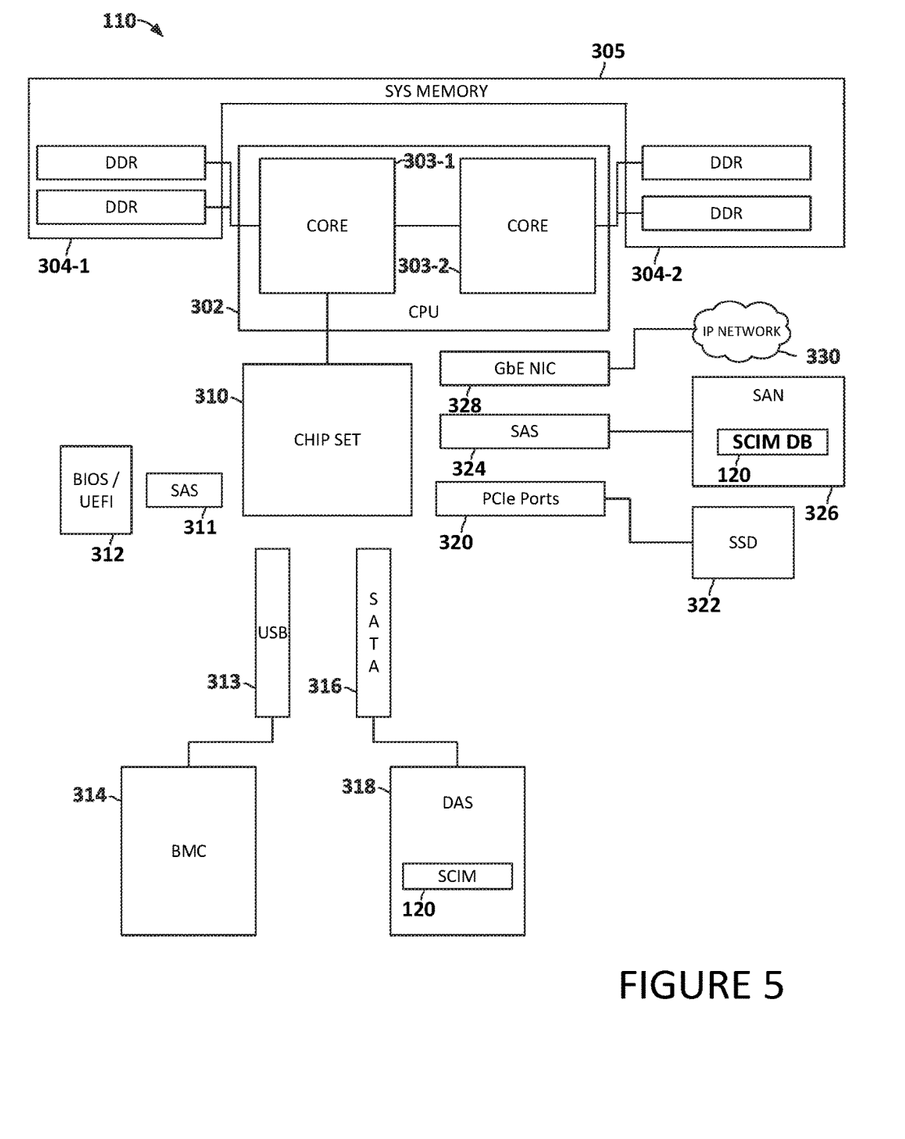
FIG. 5 is a block diagram of an information handling system configured to implement the configuration management resource of FIG. 1 and FIG. 2.

FIG. 5 illustrates selected elements of an example implementation of the configuration management resource 110 illustrated in FIG. 1. The embodiment of configuration management resource 110 illustrated in FIG. 5 includes a central processing unit (CPU) 302 coupled to system memory 305 and a chipset 310. The CPU 302 illustrated in FIG. 5 includes dual processing cores 303-1 and 3032, each coupled to a corresponding portion 304-1 and 304-2 of system memory 305.

The chipset 310 illustrated in FIG. 5 provides support for various I/O interfaces each supporting one or more ports, connections, or lanes as applicable. A suitable legacy or low bandwidth, low pin count (LPC) interface 311 may couple BIOS/UEFI flash 312 to chipset 310 while a universal serial bus interface 313 provides a connection between baseboard management controller (BMC) 314 and CPU 302 via chipset 310. A serial ATA interface 316 provides support for any disk-based direct attached storage 318 that information handling resource 300 may include. Peripheral components interconnect express (PCIe) interface 320 provides an expansion bus to support any of a variety of peripherals including in at least some instances, a solid state drive (SSD) 322. A serial attached SCSI (SAS) interface 324 is illustrated coupled to a storage area network (SAN) enclosure 326 and a network interface controller 328 provides a Gigabit Ethernet connection to an internal or external network 330.

FIG. 5 illustrates the SCIM 120 of configuration resource manager 110 represented as CPU-executable instructions stored in direct attached storage 318 of configuration resource manager 110 and the SCIM database 130 represented as a data structure stored in SAN enclosure 326. In such an embodiments, configuration management resource 110 may include or support a database management module, not depicted explicitly, that enables SCIM 120 to interact with SCIM DB 130 using existing database query methods. Although FIG. 5 illustrates a particular configuration of configuration management resource 110, the illustrated resource are exemplary and other embodiments, including virtualized embodiments, may be employed.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventory to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A solution configuration management method performed by an information handling system, wherein the method comprises:
   accessing, by a central processing unit of the information handling system, a master manifest indicating one or more baseline configurations for an infrastructure assembly, wherein the infrastructure assembly includes a heterogeneous plurality of information handling resources and wherein the master manifest indicates:
      a resource type identifier corresponding to each of the heterogeneous plurality of information handling resources; and
      one or more compliance-capable resources for each resource type identifier;
   determining, by the central processing unit, a first configuration of a first infrastructure wherein the first infrastructure comprises a first plurality of deployed information handling resources;
   associating a first information handling resource of the first plurality of deployed information handling resources with a first registered configuration plugin, wherein the first registered configuration plugin:

supports one or more representational state transfer (REST) compliant methods for communicating with the first information handling resource; and defines one or more interfaces, compatible with the first information handling resource, for each of the one or more REST compliant methods; and performing, by the central processing unit, a validation operation to determine whether the first configuration corresponds to any of the one or more baseline configurations.

2. The solution configuration management method of claim 1, wherein the master manifest indicates:
one or more capable resources for each resource type identifier;
one or more components for each of the one or more capable resources; and
one or more baseline-required attributes of each of the one or more components.

3. The solution configuration management method of claim 1, wherein the master manifest indicates a first component and an extended attribute for the first component, wherein the extended attribute is selected from:
a dependency attribute, wherein the dependency attribute indicates a second component and wherein the second component is required for each of the one or more baseline configurations that include the first component; and
an adjacency attribute, wherein the adjacency attribute indicates a second component to which the first component must be connected for each of the one or more baseline configurations that include the first component.

4. The solution configuration management method of claim 1, wherein the master manifest indicates one or more capable resources for each resource type identifier.

5. The solution configuration management method of claim 4, wherein the master manifest identifies indicates:
one or more baseline components for each of the one or more capable resources; and
one or more baseline configuration attributes for each of the one or more baseline components.

6. The solution configuration management method of claim 5, wherein the validation operation includes:
determining whether the first configuration includes baseline components and baseline configuration attributes identified in the master manifest.

7. The solution configuration management method of claim 1, wherein the one or more REST compliant methods includes a GET method for the first information handling resource, wherein the GET method is configured to:
retrieve component information indicative of a group of one or more components implemented in the first information handling resource; and
retrieve one or more component attributes for each of the group of one or more components implemented in the first information handling resource.

8. The solution configuration management method of claim 7, wherein determining the first configuration of the first infrastructure includes:
executing the GET method for the first information handling resource.

9. The solution configuration management method of claim 7, wherein the one or more REST compliant methods includes a TEST method and wherein the TEST method is configured to:
determine whether a first component attribute is compliant with a requirement for the first component attribute, wherein the requirement is set forth in the master manifest.

10. The solution configuration method of claim 9, wherein the one or more REST compliant methods includes a SET method and wherein the SET method is configured to:
incorporate the first configuration in the master manifest as one of the one or more baseline configurations.

11. The solution configuration management method of claim 1, wherein:
the infrastructure assembly comprises a plurality of information handling resources mounted in a rack cabinet; and
each resource type identifier is selected from a resource type group consisting of:
a rack mount server;
a rack mount chassis;
a storage enclosure;
a network switch;
a modular computer information handling resource;
a modular storage information handling resource; and
a modular switch information handling resource.

12. An information handling system, wherein the information handling system comprises:
a central processing unit (CPU); and
a computer readable medium including process-executable program instructions that, when executed, cause the CPU to perform operations, wherein the operations include:
accessing a master manifest indicating one or more baseline configurations for a infrastructure assembly, wherein the infrastructure assembly includes a heterogeneous plurality of information handling resources and wherein the master manifest indicates:
a resource type identifier corresponding to each of the heterogeneous plurality of information handling resources; and
one or more compliance-capable resources for each resource type identifier;
determining a first configuration of a first infrastructure wherein the first infrastructure comprises a first plurality of deployed information handling resources;
associating a first information handling resource of the first plurality of deployed information handling resources with a first registered configuration plugin, wherein the first registered configuration plugin:
supports one or more representational state transfer (REST) compliant methods for communicating with the first information handling resource; and
defines one or more interfaces, compatible with the first information handling resource, for each of the one or more REST compliant methods; and
performing a validation process to determine whether the first configuration corresponds to any of the one or more baseline configurations.

13. The information handling system of claim 12, wherein:
the master manifest indicates:
one or more capable resources for each resource type identifier;
one or more components for each of the one or more capable resources; and
one or more baseline-required attributes of each of the one or more components.

14. The information handling system of claim 13, wherein the master manifest indicates a first component and an extended attribute for the first component, wherein the extended attribute is selected from:
   a dependency attribute, wherein the dependency attribute indicates a second component and wherein the second component is required for each of set of one or more baseline configurations that include the first component; and
   an adjacency attribute, wherein the adjacency attribute indicates a second component to which the first component must be connected for each of the one or more baseline configurations that include the first component.

15. The information handling system of claim 12, wherein:
   the master manifest indicates one or more capable resources for each resource type identifier.

16. The information handling system of claim 15, wherein the master manifest indicates:
   one or more baseline components for each of the one or more capable resources; and
   one or more baseline configuration attributes for each of the one or more baseline components.

17. The information handling system of claim 16, wherein the validation process comprises:
   determining whether each of the one or more baseline components and each of the one or components baseline attributes identifying baseline components and baseline configuration attributes consistent with the first configuration.

18. The information handling system of claim 12, wherein:
   the one or more REST compliant methods includes a GET method for the first information handling resource, wherein the GET method is configured to:
   retrieve component information indicative of a group of one or more components implemented in the first information handling resource; and
   retrieve component attributes for each of the group of one or more components implemented in the first information handling resource; and
   wherein determining the first configuration of the infrastructure assembly includes:
      executing the GET method for the first information handling resource.

19. The information handling system of claim 18, wherein the one or more REST compliant methods includes a TEST method and wherein the TEST method is configured to:
   determine whether a first component attribute is compliant with a requirement for the first component attribute, wherein the requirement for the first component attribute is set forth in the master manifest.

20. The information handling system of claim 19, wherein the one or more REST complaint methods includes a SET method and wherein the SET method is configured to:
   incorporate the first configuration in the master manifest as one of the one or more baseline configurations.

* * * * *